(12) United States Patent
Yoshitomi et al.

(10) Patent No.: US 11,408,059 B2
(45) Date of Patent: Aug. 9, 2022

(54) HIGH-STRENGTH GALVANIZED STEEL SHEET AND METHOD FOR MANUFACTURING SAME

(71) Applicant: JFE Steel Corporation, Tokyo (JP)

(72) Inventors: Hiromi Yoshitomi, Tokyo (JP); Yasuaki Okita, Tokyo (JP); Masaki Koba, Tokyo (JP); Yoshihiko Ono, Tokyo (JP); Hiroshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 8 days.

(21) Appl. No.: 16/766,398

(22) PCT Filed: Aug. 20, 2018

(86) PCT No.: PCT/JP2018/030693
§ 371 (c)(1),
(2) Date: May 22, 2020

(87) PCT Pub. No.: WO2019/106895
PCT Pub. Date: Jun. 6, 2019

(65) Prior Publication Data
US 2020/0377978 A1    Dec. 3, 2020

(30) Foreign Application Priority Data

Nov. 29, 2017  (JP) .............................. JP2017-228555

(51) Int. Cl.
*C22C 38/04*     (2006.01)
*C22C 38/00*     (2006.01)
(Continued)

(52) U.S. Cl.
CPC .............. *C22C 38/04* (2013.01); *B32B 15/01* (2013.01); *B32B 15/013* (2013.01); *B32B 15/04* (2013.01);
(Continued)

(58) Field of Classification Search
CPC ......... C22C 18/02; C22C 18/00; C22C 38/04; C22C 38/001; C22C 38/002;
(Continued)

(56) References Cited

U.S. PATENT DOCUMENTS 8,133,330 B2   3/2012  Futamura et al.
9,611,524 B2   4/2017  Hamada et al.
(Continued)

FOREIGN PATENT DOCUMENTS

CN    103717774 A    4/2014
CN    104145039 A    11/2014
(Continued)

OTHER PUBLICATIONS

Chinese Office Action for Chinese Application No. 201880076648. 3, dated Nov. 26, 2021, with Concise Statement of Relevance of Office Action, 5 pages.
(Continued)

*Primary Examiner* — Michael E. La Villa
(74) *Attorney, Agent, or Firm* — RatnerPrestia

(57) ABSTRACT

A high-strength galvanized steel sheet includes a steel sheet having a steel composition having a specific component composition, a steel structure containing martensite and bainite at more than or equal to 70% (including 100%), ferrite at less than 20% (including 0%), and retained austenite at less than 5% (including 0%) in terms of area ratio, the amount of diffusible hydrogen in steel being less than or equal to 0.20 mass ppm; and a galvanizing layer provided on a surface of the steel sheet, having a content amount of Fe
(Continued)

of 8 to 15% in mass %, and having an coating weight per one surface of 20 to 120 g/m$^2$, wherein the amount of Mn oxides contained in the galvanizing layer is less than or equal to 0.050 g/m$^2$, and a tensile strength is more than or equal to 1100 MPa and a yield ratio is more than or equal to 0.85.

18 Claims, 1 Drawing Sheet

(51) Int. Cl.
| | |
|---|---|
| C22C 38/02 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/20 | (2006.01) |
| C22C 38/60 | (2006.01) |
| C21D 8/02 | (2006.01) |
| C21D 9/46 | (2006.01) |
| C23G 1/00 | (2006.01) |
| C23C 2/06 | (2006.01) |
| C23C 2/12 | (2006.01) |
| C23C 2/02 | (2006.01) |
| C22C 38/38 | (2006.01) |
| C23C 2/40 | (2006.01) |
| C23C 2/28 | (2006.01) |
| C21D 9/56 | (2006.01) |
| C21D 1/76 | (2006.01) |
| C22C 18/02 | (2006.01) |
| C22C 38/22 | (2006.01) |
| C22C 38/26 | (2006.01) |
| C22C 38/40 | (2006.01) |
| C22C 38/44 | (2006.01) |
| C22C 38/18 | (2006.01) |
| C22C 38/46 | (2006.01) |
| C22C 38/24 | (2006.01) |
| C22C 38/54 | (2006.01) |
| C22C 38/28 | (2006.01) |
| C22C 38/32 | (2006.01) |
| C22C 38/50 | (2006.01) |
| C22C 38/48 | (2006.01) |
| C22C 38/42 | (2006.01) |
| C23C 2/04 | (2006.01) |
| B32B 15/01 | (2006.01) |
| C23C 30/00 | (2006.01) |
| C21D 9/573 | (2006.01) |
| B32B 15/18 | (2006.01) |
| C23C 2/26 | (2006.01) |
| B32B 15/04 | (2006.01) |

(52) U.S. Cl.
CPC ............ *B32B 15/043* (2013.01); *B32B 15/18* (2013.01); *C21D 1/76* (2013.01); *C21D 8/0221* (2013.01); *C21D 8/0226* (2013.01); *C21D 8/0236* (2013.01); *C21D 8/0242* (2013.01); *C21D 8/0247* (2013.01); *C21D 8/0263* (2013.01); *C21D 8/0273* (2013.01); *C21D 9/46* (2013.01); *C21D 9/561* (2013.01); *C21D 9/562* (2013.01); *C21D 9/573* (2013.01); *C21D 9/5735* (2013.01); *C22C 18/02* (2013.01); *C22C 38/001* (2013.01); *C22C 38/002* (2013.01); *C22C 38/008* (2013.01); *C22C 38/02* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *C23C 2/02* (2013.01); *C23C 2/04* (2013.01); *C23C 2/06* (2013.01); *C23C 2/12* (2013.01); *C23C 2/26* (2013.01); *C23C 2/28* (2013.01); *C23C 2/40* (2013.01); *C23C 30/00* (2013.01); *C23C 30/005* (2013.01); *C23G 1/00* (2013.01); *C21D 2211/001* (2013.01); *C21D 2211/002* (2013.01); *C21D 2211/005* (2013.01); *C21D 2211/008* (2013.01); *Y10T 428/12799* (2015.01); *Y10T 428/12951* (2015.01); *Y10T 428/12958* (2015.01); *Y10T 428/12972* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01); *Y10T 428/27* (2015.01)

(58) Field of Classification Search
CPC ....... C22C 38/008; C22C 38/02; C22C 38/06; C22C 38/08; C22C 38/12; C22C 38/14; C22C 38/16; C22C 38/20; C22C 38/38; C22C 38/60; C22C 38/18; C22C 38/22; C22C 38/24; C22C 38/26; C22C 38/28; C22C 38/32; C22C 38/40; C22C 38/42; C22C 38/44; C22C 38/46; C22C 38/48; C22C 38/50; C22C 38/54; C21D 1/76; C21D 8/0226; C21D 8/0236; C21D 8/0242; C21D 8/0247; C21D 8/0273; C21D 8/0221; C21D 8/0263; C21D 9/46; C21D 9/561; C21D 9/562; C21D 9/573; C21D 9/5735; C21D 2211/001; C21D 2211/002; C21D 2211/005; C21D 2211/008; C23C 2/02; C23C 2/06; C23C 2/12; C23C 2/28; C23C 2/40; C23C 2/04; C23C 2/26; C23C 30/00; C23C 30/005; C23G 1/00; B32B 15/01; B32B 15/013; B32B 15/04; B32B 15/043; B32B 15/18; Y10T 428/12799; Y10T 428/12951; Y10T 428/12958; Y10T 428/12972; Y10T 428/2495; Y10T 428/24967; Y10T 428/26; Y10T 428/263; Y10T 428/264; Y10T 428/265; Y10T 428/27
See application file for complete search history.

(56) References Cited

U.S. PATENT DOCUMENTS

| | | | |
|---|---|---|---|
| 2014/0162088 A1* | 6/2014 | Kawata | ................... C22C 38/22 428/659 |
| 2014/0234653 A1 | 8/2014 | Nozaki et al. | |
| 2017/0321297 A1 | 11/2017 | Takashima et al. | |
| 2017/0369965 A1 | 12/2017 | Ikeda et al. | |
| 2020/0291499 A1* | 9/2020 | Yoshitomi | ............... C22C 38/60 |
| 2020/0377978 A1 | 12/2020 | Yoshitomi et al. | |
| 2021/0115529 A1 | 4/2021 | Yoshitomi et al. | |

FOREIGN PATENT DOCUMENTS

| | | |
|---|---|---|
| CN | 107208222 A | 9/2017 |
| EP | 2738276 A1 | 6/2014 |

(56) References Cited

FOREIGN PATENT DOCUMENTS

| | | |
|---|---|---|
| EP | 2821521 A1 | 1/2015 |
| EP | 3009527 A1 | 4/2016 |
| EP | 3243923 A1 | 11/2017 |
| EP | 3409808 A1 | 12/2018 |
| JP | 2007231373 A | 9/2007 |
| JP | 2011111671 A | 6/2011 |
| JP | 2012041597 A | 3/2012 |
| JP | 2013213232 A | 10/2013 |
| JP | 5438302 B2 | 3/2014 |
| JP | 2015151607 A | 8/2015 |
| JP | 2016130356 A | 7/2016 |
| JP | 2017145441 A | 8/2017 |
| KR | 26160012205 A | 2/2016 |
| WO | 2013047836 A1 | 4/2013 |
| WO | 2016092733 A1 | 6/2016 |
| WO | 2017131055 A1 | 8/2017 |
| WO | 2017131056 A1 | 8/2017 |

OTHER PUBLICATIONS

Korean Office Action for Korean Application No. 10-2020-7015197, dated Sep. 24, 2021, with Concise Statement of Relevance of Office Action, 7 pages.
International Search Report and Written Opinion for International Application No. PCT/JP2018/030693, dated Nov. 13, 2018, 5 pages.
Extended European Search Report for European Application No. 18 884 774.3, dated Nov. 4, 2020, 10 pages.
Chinese Office Action with Search Report for Chinese Application No. 201880076648.3, dated May 6, 2021, 11 pages.
Korean Grant of Patent for Korean Application No. 10-2020-7015197, dated Mar. 28, 2022, with translation, 3 pages.
Non Final Office Action for U.S. Appl. No. 16/765,708, dated Mar. 17, 2022, 12 pages.
Chinese Office Action for Chinese Application No. 201880076648.3, dated May 7, 2022, with Concise Statement of Relevance of Office Action, 9 pages.

\* cited by examiner

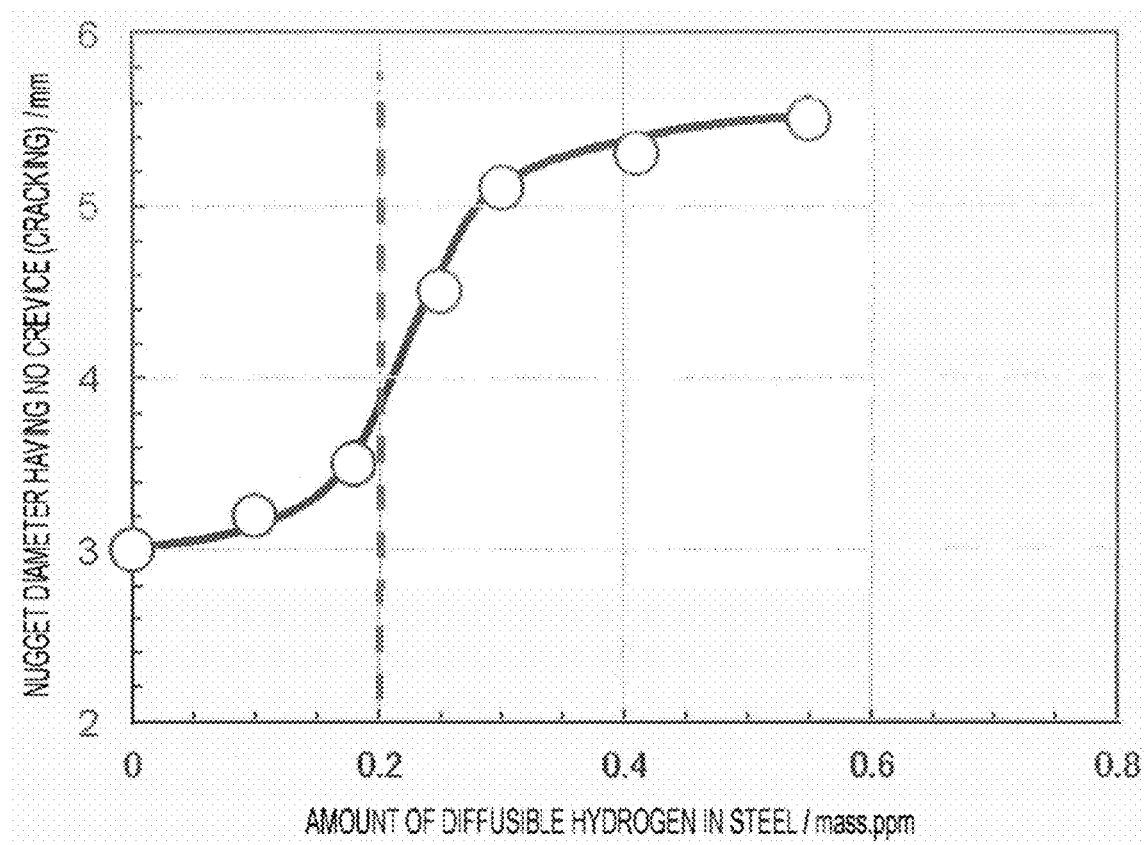

HIGH-STRENGTH GALVANIZED STEEL SHEET AND METHOD FOR MANUFACTURING SAME

CROSS REFERENCE TO RELATED APPLICATIONS

This is the U.S. National Phase application of PCT/JP2018/030693, filed Aug. 20, 2018, which claims priority to Japanese Patent Application No. 2017-228555, filed Nov. 29, 2017, the disclosures of these applications being incorporated herein by reference in their entireties for all purposes.

FIELD OF THE INVENTION

The present invention relates to a high-strength galvanized steel sheet that is excellent in hydrogen embrittlement resistance, which becomes more likely to be a problem as strength becomes higher, and is suitable for building materials and automotive collision-resistant parts, and a method for manufacturing the same.

BACKGROUND OF THE INVENTION

In these days when collision safety and fuel efficiency improvement of automobiles are strongly required, the strength increase of steel sheets that are materials of parts is advanced. Among them, materials of parts used around the cabin are required to have not only high tensile strength but also high yield strength from the viewpoint of ensuring the safety of the occupant when the automobile collides. Further, in view of the fact that automobiles are being widely spread on a global scale and automobiles are used for various uses in diverse areas and climates, steel sheets that are materials of parts are required to have high antirust properties. Literatures regarding properties such as high strength include Patent Literatures 1 to 4 below.

Patent Literature 1 discloses a hot-dip galvanized steel sheet with a high yield ratio and high strength excellent in processability, and a method for manufacturing the same.

Patent Literature 2 discloses a method of providing a steel sheet that has a tensile strength of 980 MPa or higher, exhibits a high yield ratio, and is excellent in processability (specifically, strength-ductility balance).

Further, Patent Literature 3 discloses a high-strength hot-dip galvanized steel sheet that uses, as a base material, a high-strength steel sheet containing Si and Mn and is excellent in the external appearance of coating, corrosion resistance, exfoliation resistance during high processing, and processability during high processing, and a method for manufacturing the same.

Further, Patent Literature 4 discloses a method for manufacturing a high-strength coated steel sheet having good delayed fracture resistance properties.

Meanwhile, in general, when coating of Zn, Ni, or the like is provided, hydrogen is less likely to be released from or incorporated into the material, and therefore hydrogen in steel so-called diffusible hydrogen is likely to stay behind and the hydrogen embrittlement of the material is likely to occur. Literatures regarding such hydrogen embrittlement include Patent Literatures 5 and 6 below.

Patent Literature 5 discloses a coated steel sheet for hot pressing excellent in delayed fracture resistance properties, and a method for manufacturing the same. In Patent Literature 5, a precipitate in steel is utilized; before coating, the entry of diffusible hydrogen is suppressed as much as possible by means of manufacturing process conditions; and hydrogen in steel after coating is caused to be trapped as non-diffusible hydrogen.

Patent Literature 6 discloses a high-strength steel sheet that is made of a steel sheet with a base material strength (TS) of less than approximately 870 MPa and is excellent in hydrogen brittleness of a weld, and a method for manufacturing the same. Patent Literature 6 has improved hydrogen brittleness by dispersing oxides in the steel.

PATENT LITERATURE

Patent Literature 1: JP 5438302 B2
Patent Literature 2: JP 2013-213232 A
Patent Literature 3: JP 2015-151607 A
Patent Literature 4: JP 2011-111671 A
Patent Literature 5: JP 2012-41597 A
Patent Literature 6: JP 2007-231373 A

SUMMARY OF THE INVENTION

In the technology of Patent Literature 1, the steel structure is a composite structure containing ferrite and martensite; hence, although the metal structure has a high yield ratio, the yield ratio is increased only up to approximately 0.70. Further, in Patent Literature 1, large amounts of Si and Mn are contained, and therefore coating quality tends to be insufficient. Further, hydrogen embrittlement resistance is not improved actively.

In Patent Literature 2, although the addition of Si, which reduces coating adhesion, is suppressed, cases where there is an addition amount of Mn of more than 2.0% encounter a situation where Mn-based oxides are likely to be generated on the surface of the steel sheet and coatability is generally impaired. In Patent Literature 2, conditions at the time of forming a coating layer are not particularly limited but conditions usually used are employed, and coatability is poor. Further, hydrogen embrittlement resistance is not improved actively.

In Patent Literature 3, in an annealing step before coating, the hydrogen concentration of an atmosphere within a furnace is limited to more than or equal to 20 vol %, and the annealing temperature to 600 to 700° C. It is hard to apply this technology for materials having $A_{c3}$ points more than 800° C. in terms of metal structure formation. Further, if the hydrogen concentration in an atmosphere within an annealing furnace is high, the concentration of hydrogen in steel is increased, and hydrogen embrittlement resistance is insufficient.

In Patent Literature 4, although delayed fracture resistance properties after processing are improved, the hydrogen concentration during annealing is high, and hydrogen remains in the base material itself and hydrogen embrittlement resistance is deteriorated.

In Patent Literature 5, if there is a large amount of several-micron-order precipitate, mechanical properties of the material itself are degraded.

In Patent Literature 6, since the upper limit of the hydrogen concentration in a furnace of a continuous coating line is 60%, annealing at a high temperature more than or equal to the $A_{c3}$ point causes a large amount of hydrogen to be incorporated into the steel. Therefore, the method of Patent Literature 6 cannot manufacture an ultra-high-strength steel sheet having TS≥1100 MPa excellent in hydrogen embrittlement resistance.

An object according to aspects of the present invention is, for a super-high-strength coated steel sheet having concern with hydrogen embrittlement, to provide a high-strength galvanized steel sheet that has material quality that has achieved a high yield strength of high demand, is excellent in the external appearance of coating and the hydrogen embrittlement resistance of the material, and has a high yield strength suitable for building materials and automotive collision-resistant parts, and a method for manufacturing the same.

The present inventors, in order to solve the issues described above, diligently conducted investigations of various steel sheets regarding the relationship between tensile strength (TS) and yield strength (YS), and regarding overcoming nugget cracking of resistance spot welds as coatability and hydrogen embrittlement resistance. As a result, the issue mentioned above has been solved by creating the most suitable steel structure and controlling the amount of hydrogen in steel by appropriately adjusting manufacturing conditions in addition to the component composition of the steel sheet. Specifically, aspects of the present invention include the following.

[1] A high-strength galvanized steel sheet including: a steel sheet having a steel composition having a component composition containing, in mass %, C: more than or equal to 0.10% and less than or equal to 0.30%, Si: less than 1.2%, Mn: more than or equal to 2.0% and less than or equal to 3.5%, P: less than or equal to 0.010%, S: less than or equal to 0.002%, Al: less than or equal to 1%, N: less than or equal to 0.006%, and the balance including Fe and unavoidable impurities, and a steel structure containing martensite and bainite at more than or equal to 70% (including 100%), ferrite at less than 20% (including 0%), and retained austenite at less than 5% (including 0%) in terms of area ratio, the amount of diffusible hydrogen in steel being less than or equal to 0.20 mass ppm; and a galvanizing layer provided on a surface of the steel sheet, having a content amount of Fe of 8 to 15% in mass %, and having an coating weight per one surface of 20 to 120 g/m$^2$, wherein the amount of Mn oxides contained in the galvanizing layer is less than or equal to 0.050 g/m$^2$, and a tensile strength is more than or equal to 1100 MPa and a yield ratio is more than or equal to 0.85.

[2] The high-strength galvanized steel sheet according to [1], wherein the component composition further contains at least one selected from, in mass %, one or more of Ti, Nb, V, and Zr: 0.005 to 0.1% in total, one or more of Mo, Cr, Cu, and Ni: 0.005 to 0.5% in total, and B: 0.0003 to 0.005%.

[3] The high-strength galvanized steel sheet according to [1] or [2], wherein the component composition further contains, in mass %, any one or two selected from Sb: 0.001 to 0.1% and Sn: 0.001 to 0.1%.

[4] The high-strength galvanized steel sheet according to any one of [1] to [3], wherein the component composition further contains, in mass %, Ca: less than or equal to 0.0010%.

[5] A method for manufacturing a high-strength galvanized steel sheet including: an annealing step of allowing a cold rolled material having the component composition according to any one of [1] to [4] to stay in an atmosphere within an annealing furnace with a hydrogen concentration H of more than or equal to 1 vol % and less than or equal to 13 vol %, in a temperature region of temperature within the annealing furnace T of an $A_{c3}$ point−20° C. to 900° C. for more than or equal to 5 seconds, then performing cooling, and allowing the cold rolled material to stay in a temperature region of 400 to 550° C. for more than or equal to 10 seconds; a coating step of subjecting a steel sheet after the annealing step to coating treatment and alloying treatment, and performing cooling up to less than or equal to 100° C. at an average cooling rate of more than or equal to 3° C./s; and a post heat treatment step of allowing a coated steel sheet after the coating step to stay in an atmosphere within a furnace with a hydrogen concentration H of less than or equal to 10 vol % and a dew point Dp of less than or equal to 50° C., at a temperature T (° C.) of more than or equal to 200° C. and less than or equal to 350° C. for more than or equal to a time t (hr) that is more than or equal to 0.005 (hr) and satisfies a formula (1):

$$130-18.3 \times \ln(t) \leq T \qquad (1).$$

[6] The method for manufacturing a high-strength galvanized steel sheet according to [5], including, before the annealing step: a pretreatment step of heating the cold rolled material up to an $A_{c3}$ point to the $A_{c3}$ point+50° C. in a temperature region and performing pickling.

[7] The method for manufacturing a high-strength galvanized steel sheet according to [5] or [6], wherein, after the coating step, temper rolling is performed at an extension rate of more than or equal to 0.1%.

[8] The method for manufacturing a high-strength galvanized steel sheet according to [7], wherein width trimming is performed after the post heat treatment step.

[9] The method for manufacturing a high-strength galvanized steel sheet according to [7], wherein width trimming is performed before the post heat treatment step, and a staying time t (hr) for staying at a temperature T (° C.) of more than or equal to 200° C. and less than or equal to 350° C. in the post heat treatment step is more than or equal to 0.005 (hr) and satisfies a (2) formula:

$$115-18.3 \times \ln(t) \leq T \qquad (2).$$

According to aspects of the present invention, a high-strength galvanized steel sheet that has high strength of a tensile strength of more than or equal to 1100 MPa, preferably more than or equal to 1150 MPa, has a yield ratio (yield strength ratio) of more than or equal to 0.85, is excellent in surface properties (coatability and surface external appearance), and is excellent also in hydrogen embrittlement resistance is obtained.

BRIEF DESCRIPTION OF THE DRAWINGS

The FIGURE is a diagram showing an example of relationship between the amount of diffusible hydrogen and the smallest nugget diameter.

DETAILED DESCRIPTION OF EMBODIMENTS OF THE INVENTION

Hereafter, the embodiments of the present invention will be described. Here, the present invention is not limited to the embodiments described below.

High-Strength Galvanized Steel Sheet

A high-strength galvanized steel sheet according to aspects of the present invention includes a steel sheet and a galvanizing layer formed on a surface of the steel sheet. In the following, first the steel sheet is described, and then the galvanizing layer is described.

The component composition of the steel sheet is as follows. In the following description, "%" that is the unit of the content amount of a component means "mass %".

C: More than or Equal to 0.10% and Less than or Equal to 0.30% (C: 0.10 to 0.30%)

C is an element effective to achieve high strength of the steel sheet, and contributes to strength increase by forming martensite, which is one of the hard phases of the steel structure. To obtain these effects, an amount of C needs to be more than or equal to 0.10%. The content amount of C is preferably more than or equal to 0.11%, and more preferably more than or equal to 0.12%. On the other hand, if the content amount of C is more than 0.30%, in accordance with aspects of the present invention, spot weldability is significantly degraded, and at the same time the steel sheet is hardened due to the strength increase of martensite and moldability such as ductility tends to be reduced. Thus, the content amount of C is set to less than or equal to 0.30%. From the viewpoint of properties improvement, the content amount of C is set to preferably less than or equal to 0.28%, and more preferably less than or equal to 0.25%.

Si: Less than 1.2%

Si is an element contributing mainly to strength increase by solid solution strengthening; and experiences relatively small reduction in ductility with respect to strength rising, and contributes to not only strength but also improvement in balance between strength and ductility. On the other hand, Si is likely to form Si-based oxides on the surface of the steel sheet and may be a cause of coating defect, and furthermore stabilizes austenite during annealing and makes it likely to allow retained austenite to be formed in the final product. Thus, it is sufficient to add only an amount necessary to ensure strength; from this point of view, the content amount of Si is desirably more than or equal to 0.01%. The content amount of Si is more preferably more than or equal to 0.02%. The content amount of Si is still more preferably more than or equal to 0.05%. From the viewpoints of coatability and the production of retained austenite, the upper limit is set to less than 1.2%. The upper limit is preferably less than or equal to 1.0%. The upper limit is more preferably less than or equal to 0.9%.

Mn: More than or Equal to 2.0% and Less than or Equal to 3.5%

Mn is effective as an element contributing to strength increase by solid solution strengthening and martensite formation. To obtain this effect, the content amount of Mn needs to be set to more than or equal to 2.0%. The content amount of Mn is preferably more than or equal to 2.1%, and more preferably more than or equal to 2.2%. On the other hand, if the content amount of Mn is more than 3.5%, spot weld cracking is brought about, and unevenness is likely to occur in the steel structure due to segregation or the like of Mn and a reduction in processability is brought about. Further, if the content amount of Mn is more than 3.5%, Mn is likely to concentrate as oxides or composite oxides on the surface of the steel sheet, and may be a cause of coating defect. Thus, the content amount of Mn is set to less than or equal to 3.5%. The content amount of Mn is preferably less than or equal to 3.3%, and more preferably less than or equal to 3.0%.

P: Less than or Equal to 0.010%

P is an effective element contributing to the strength increase of the steel sheet by solid solution strengthening. If the content amount of P is more than 0.010%, processability such as weldability and stretch flange formability is reduced. Thus, the content amount of P is set to less than or equal to 0.010%. The content amount of P is preferably less than or equal to 0.008%, and more preferably less than or equal to 0.007%. The lower limit is not particularly prescribed; however, if the lower limit is less than 0.001%, a reduction in production efficiency and an increase in dephosphorization cost are brought about in the manufacturing course; thus, the lower limit is preferably set to more than or equal to 0.001%.

S: Less than or Equal to 0.002%

S is a harmful element that is a cause of hot shortness, brings about a reduction in weldability, and reduces the processability of the steel sheet by existing as sulfide-based inclusions in the steel. Hence, the content amount of S is preferably reduced as much as possible. Thus, the content amount of S is set to less than or equal to 0.002%. The lower limit is not particularly prescribed; however, if the lower limit is less than 0.0001%, a reduction in production efficiency and cost increase are brought about in the existing manufacturing course; thus, the lower limit is preferably set to more than or equal to 0.0001%.

Al: Less than or Equal to 1%

Al is added as a deoxidizing material. From the viewpoint of obtaining this effect, a preferred content amount is more than or equal to 0.01%. The content amount of Si is more preferably more than or equal to 0.02%. On the other hand, content amounts of Al of more than 1% bring about a rise in source material cost, and are a cause of inducing surface defects of the steel sheet; thus, 1% is taken as the upper limit. The upper limit is preferably less than or equal to 0.4%, and more preferably less than or equal to 0.1%.

N: Less than or Equal to 0.006%

If the content amount of N is more than 0.006%, excess nitrides are produced in the steel and ductility and toughness are reduced, and the surface appearance quality of the steel sheet may be deteriorated. Hence, the content amount of N is set to less than or equal to 0.006%, preferably less than or equal to 0.005%, and more preferably less than or equal to 0.004%. Although the content amount is preferably as small as possible from the viewpoint of improving ductility by making ferrite cleaner, such amounts bring about a reduction in production efficiency and cost increase in the manufacturing course; thus, a preferred lower limit is set to more than or equal to 0.0001%. The lower limit is more preferably more than or equal to 0.0010%, and still more preferably more than or equal to 0.0015%.

The component composition of the steel sheet mentioned above may contain, as an optional component, one or more of Ti, Nb, V, and Zr at 0.005 to 0.1% in total, one or more of Mo, Cr, Cu, and Ni at 0.005 to 0.5% in total, and/or B: 0.0003 to 0.005%.

Ti, Nb, V, and Zr contribute to the strength increase of the steel sheet, especially high YR, by being formed as a fine precipitate that forms, together with C or N, a carbide or a nitride (there is also a case of a carbonitride). From the viewpoint of obtaining this effect, it is preferable to contain one or more of Ti, Nb, V, and Zr at more than or equal to 0.005% in total. The total content amount is more preferably more than or equal to 0.015%, and still more preferably more than or equal to 0.030%. These elements are effective also for trap sites (rendering harmless) of hydrogen in steel. However, excess content of more than 0.1% in total increase deformation resistance during cold rolling and inhibit productivity; in addition, the presence of a excess or coarse precipitate reduces the ductility of ferrite, and reduces processability such as ductility, bendability, and stretch flange formability of the steel sheet. Thus, the total amount mentioned above is preferably set to less than or equal to 0.1%. The total amount is more preferably less than or equal to 0.08%, and still more preferably less than or equal to 0.06%.

Mo, Cr, Cu, Ni, and B enhance hardenability and facilitate the production of martensite, and are therefore elements contributing to strength increase. Thus, the amount of one or more of Mo, Cr, Cu, and Ni is preferably set to more than or equal to 0.005% in total. The amount is more preferably more than or equal to 0.01%, and still more preferably more than or equal to 0.05%. In the case of B, the amount of B is preferably more than or equal to 0.0003%, more preferably more than or equal to 0.0005%, and still more preferably more than or equal to 0.0010%. For Mo, Cr, Cu, and Ni, excess addition of more than 0.5% in total lead to the saturation of the effect and cost increase. For Cu, it induces cracking during hot rolling, and is a cause of the occurrence of surface flaws; thus, the upper limit of the amount of Cu is set to 0.5%. For Ni, there is an effect of hindering the occurrence of surface flaws due to containing Cu, and it is therefore desirable that Ni be contained when Cu is contained. In particular, it is preferable to contain an amount of Ni more than or equal to ½ of the content amount of Cu. Also for B, the lower limit mentioned above for obtaining the effect of suppressing ferrite production occurring during an annealing cooling course is provided. Further, excess content amounts of B of more than 0.005% lead to the saturation of the effect. Excess hardenability has also a disadvantage such as weld cracking during welding.

The component composition of the steel sheet mentioned above may contain, as an optional component, Sb: 0.001 to 0.1% and/or Sn: 0.001 to 0.1%.

Sb and Sn suppress decarburization, denitrification, deboronization, etc., and are elements effective to suppress the reduction in the strength of the steel sheet. These elements are effective also to suppress spot welding cracking; thus, each of the content amount of Sn and the content amount of Sb is preferably more than or equal to 0.001%. Each content amount is more preferably more than or equal to 0.003%, and still more preferably more than or equal to 0.005%. However, for both Sn and Sb, excess content amounts of more than 0.1% reduce processability such as stretch flange formability of the steel sheet. Thus, each of the content amount of Sn and the content amount of Sb is preferably set to less than or equal to 0.1%. Each content amount is more preferably less than or equal to 0.030%, and still more preferably less than or equal to 0.010%.

The component composition of the steel sheet mentioned above may contain, as an optional component, Ca: less than or equal to 0.0010%.

Ca forms a sulfide or an oxide in the steel, and reduces the processability of the steel sheet. Hence, the content amount of Ca is preferably less than or equal to 0.0010%. The content amount of Ca is more preferably less than or equal to 0.0005%, and still more preferably less than or equal to 0.0003%. The lower limit is not particularly limited; however, in terms of manufacturing, it may be difficult to contain no Ca; thus, in view of this, the content amount of Ca is preferably more than or equal to 0.00001%. The content amount of Ca is more preferably more than or equal to 0.00005%.

In the component composition of the steel sheet mentioned above, the balance other than the above is Fe and unavoidable impurities. For the optional components mentioned above, in the case where a component having a lower limit of its content amount is contained at a ratio less than the lower limit value mentioned above, the effect according to aspects of the present invention is not impaired, and hence the optional component is regarded as an unavoidable impurity.

Next, the steel structure of the steel sheet is described.

The steel structure contains more than or equal to 70% (including 100%) of bainite and martensite (including tempered martensite), less than 20% of ferrite (including 0%), and less than 5% (including 0%) of retained austenite.

Ferrite is less than 20% (including 0%).

The presence of ferrite is not preferable form the viewpoint of obtaining high tensile strength and yield strength; however, to obtain the yield strength according to aspects of the present invention, the presence of ferrite is permitted up to less than 20% in terms of area ratio. The amount of ferrite is preferably less than or equal to 15% and more preferably less than or equal to 10%. The lower limit is not particularly limited, but is preferably more than or equal to 1%, more preferably more than or equal to 2%, and still more preferably more than or equal to 3%. Here, bainite which is formed at a comparatively high temperature and which does not contain carbides is regarded as ferrite without distinguishing such bainite from ferrite in the observation using a scanning electron microscope described in Examples below.

Total Amount of Bainite and Martensite (Including Tempered Martensite) Being More than or Equal to 70% (Including 100%)

As-quenched martensite, tempered martensite, and bainite are hard phases, and the area ratios of these hard phases are important in accordance with aspects of the present invention to obtain high tensile strength and yield strength. Martensite is particularly hard, and is effective to enhance the strength of the steel sheet. Tempered martensite and bainite (as mentioned above, bainite containing no carbide is regarded as ferrite; hence, the bainite herein refers to bainite containing a carbide) are structures important to obtain particularly high yield strength. From the above, the total amount of these hard phases is set to more than or equal to 70% in terms of area ratio. The total amount is preferably more than or equal to 80%, more preferably more than or equal to 85%, and still more preferably more than or equal to 90%. The upper limit is preferably less than or equal to 100%, preferably less than or equal to 99%, and still more preferably less than or equal to 98%.

Among these hard phases, bainite preferably accounts for more than or equal to 20% and less than or equal to 50%. Further, relative to the entire structure, bainite accounts for preferably less than or equal to 49%, more preferably less than or equal to 45%, and still more preferably less than or equal to 40%.

Retained Austenite Accounting for Less than 5% (Including 0%)

Austenite (an fcc phase) has higher hydrogen adsorption ability than ferrite (a bcc phase). Hence, if the retained austenite is transformed to martensite due to induction by stress during processing etc., there is a concern that the amount of diffusible hydrogen in the steel will be increased. Thus, the amount of retained austenite is set to less than 5%. The amount of retained austenite is more preferably less than or equal to 4%, and still more preferably less than or equal to 3%. The lower limit is not particularly limited, but is preferably more than or equal to 0%, and more preferably more than or equal to 1%.

The steel structure occasionally contains a precipitate of pearlite, carbides, etc. in the balance, as a structure other than the structure mentioned above. These other structures (the balance other than the hard phase, ferrite, or retained austenite) account for preferably less than or equal to 10%, and more preferably less than or equal to 5%, in terms of area ratio.

Results obtained by a method described in Examples are employed as the area ratios in the steel structure mentioned above. More specific method for measuring the area ratio is described in Examples, however, simple explanation is as follows. The area ratio mentioned above is found by a method in which a structure in a region of a position of ¼ (⅛ to ⅜) of the sheet thickness from the surface is taken as a representative, an L-cross section (a sheet-thickness cross section parallel to the rolling direction) of the steel sheet is polished, then corrosion is performed with a nital solution, 3 or more fields of view are observed by SEM with a magnification of 1500 times, and the photographed images are analyzed.

In the steel sheet mentioned above, the amount of diffusible hydrogen in the steel obtained by measurement by a method described in Examples is less than or equal to 0.20 mass ppm. Diffusible hydrogen in the steel degrades hydrogen embrittlement resistance. If the amount of diffusible hydrogen in the steel is an excess more than 0.20 mass ppm, cracking of a weld nugget is likely to occur during welding, for example. In accordance with aspects of the present invention, it has been revealed that an improvement effect is obtained by, before welding, making the amount of diffusible hydrogen in the steel, i.e., the matrix, less than or equal to 0.20 mass ppm. The amount of diffusible hydrogen is preferably less than or equal to 0.15 mass ppm, more preferably less than or equal to 0.10 mass ppm, and still more preferably less than or equal to 0.08 mass ppm. The lower limit is not particularly limited, but is preferably as small as possible; thus, the lower limit is 0 mass ppm. It is necessary that, before welding, the amount of diffusible hydrogen mentioned above of the matrix be made less than or equal to 0.20 mass ppm; when the amount of diffusible hydrogen of the matrix portion is less than or equal to 0.20 mass ppm in a product after welding, the amount of diffusible hydrogen can be regarded as having been less than or equal to 0.20 mass ppm before welding.

Next, the galvanizing layer is described.

The galvanizing layer has a coating weight per one surface of 20 to 120 g/m$^2$, and contains Fe at 8 to 15% in mass %.

If the coating amount is less than 20 g/m$^2$, it is difficult to ensure corrosion resistance. Thus, the coating amount is set to more than or equal to 20 g/m$^2$, preferably more than or equal to 25 g/m$^2$, and more preferably more than or equal to 30 g/m$^2$. On the other hand, if the coating amount is more than 120 g/m$^2$, exfoliation resistance is degraded. Thus, the coating amount is less than or equal to 120 g/m$_2$, preferably less than or equal to 100 g/m$^2$, and more preferably less than or equal to 80 g/m$^2$.

In the galvanizing layer, Mn oxides formed by a heat treatment step before coating are incorporated into the coating by the coating bath and the steel sheet reacting together to form an FeAl or FeZn alloy phase, and coatability and exfoliation resistance are improved.

The amount of Mn oxides contained in the galvanizing layer is preferably as low as possible. Further, if the amount of Mn oxides in the coating layer is more than 0.050 g/m$^2$, the formation reaction of an FeAl or FeZn alloy phase will be insufficient, and the occurrence of coating defect and a reduction in exfoliation resistance are brought about. However, suppressing the amount of Mn oxides to less than 0.005 g/m$^2$ is difficult because it is necessary to control the dew point to lower than a normal operating condition. Thus, the amount of Mn oxides in the coating layer is set to less than or equal to 0.050 g/m$^2$. As above, the amount of Mn oxides in the coating layer is preferably more than or equal to 0.005 g/m$^2$ and less than or equal to 0.050 g/m$^2$. The measurement of the amount of Mn oxides in the galvanizing layer is performed by a method described in Examples.

The galvanizing layer contains Fe at 8 to 15% in mass %. When the content amount of Fe in the galvanizing layer is more than or equal to 8% in mass %, it can be said that an alloy layer of Fe—Zn is sufficiently obtained. The content amount of Fe is preferably more than or equal to 9%, and more preferably more than or equal to 10%. If the content amount of Fe is more than 15%, coating adhesion is worsened, and a trouble called powdering is caused during pressing. Thus, the content amount of Fe mentioned above is set to less than or equal to 15%. The content amount of Fe is preferably less than or equal to 14%, and more preferably less than or equal to 13%.

The components contained in the galvanizing layer other than Fe, or Zn or unavoidable impurities of the balance are not particularly limited. The galvanizing layer contains Al: 0.001% to 1.0%, and may contain one or two or more selected from Pb, Sb, Si, Sn, Mg, Mn, Ni, Cr, Co, Ca, Cu, Li, Ti, Be, Bi, and the REMs at 0 to 30% in total, in mass %, for example. The galvanizing layer having a content amount of Fe in the range mentioned above is an alloyed hot-dip galvanizing layer.

Method for Manufacturing High-Strength Galvanized Steel Sheet

A method for manufacturing the high-strength galvanized steel sheet according to aspects of the present invention includes an annealing step, a coating step, and a post heat treatment step.

The annealing step is a step for heating a cold rolled material having the component composition described above in an atmosphere within an annealing furnace with a hydrogen concentration H of more than or equal to 1 vol % and less than or equal to 13 vol %, at an temperature within an annealing furnace T of (an $A_{c3}$ point−20° C.) to less than or equal to 900° C. for more than or equal to 5 s (second), then performing cooling, and allowing the cold rolled material to stay in a temperature region of 400 to 550° C. for more than or equal to 10 s.

First, a method for manufacturing a cold rolled material is described below.

A cold rolled material used in the manufacturing method according to an embodiment of the present invention is manufactured from steel material. The steel material is generally called as a slab (cast piece) which is manufactured by using a continuous casting method. A continuous casting method is used in order to prevent the macro segregation of alloy constituent chemical elements. The steel material may be manufactured by using, for example, an ingot-making method or a thin-slab casting method.

In addition, after a steel slab has been manufactured, hot rolling may be performed by using any one of a conventional method in which the slab is reheated after having been cooled to room temperature, a method in which hot rolling is performed after the slab has been charged into a heating furnace in the warm state without having been cooled to near-room temperature, a method in which hot rolling is performed immediately after the slab has been subjected to heat retention for a short time, and a method in which hot rolling is performed directly on a cast piece in the hot state.

Although there is no particular limitation on the conditions used for hot rolling, it is preferable that steel having the component composition described above be heated to a temperature of 1100° C. or higher and 1350° C. or lower, subjected to hot rolling with a finish rolling temperature of 800° C. or higher and 950° C. or lower, and coiled at a temperature of 450° C. or higher and 700° C. or lower. In the description below, those preferable conditions are explained.

It is preferable that the steel slab heating temperature be 1100° C. or higher and 1350° C. or lower. The grain diameter of precipitates in the steel slab tends to increase in the case where the slab-heating temperature is higher than the upper limit described above, and there may be a disadvantage in that it is difficult, for example, to achieve satisfactory strength through precipitation strengthening. In addition, there may be a case where precipitates having a large grain diameter have negative effects on the formation of a microstructure in the subsequent heat treatment. On the other hand, achieving a smooth steel sheet surface by appropriately performing heating in order to remove, for example, blowholes and defects from the surface of the slab through scale off so that there is a decrease in the number of cracks and in the degree of asperity on the surface of a steel sheet is advantageous. It is preferable that the heating temperature be 1100° C. or higher in order to realize such an effect. On the other hand, in the case where the heating temperature is higher than 1350° C., since there is an increase in austenite grain diameter, there is an increase in the grain diameter of the metal structure of a final product, which may result in a deterioration in the strength and processability such as bendability and stretch flange formability of a steel sheet.

The heated steel slab is subjected to hot rolling including rough rolling and finish rolling. Generally, a steel slab is made into a sheet bar by performing rough rolling, and the sheet bar is made into a hot-rolled coil by performing finish rolling. In addition, there is no problem in the case where rolling is performed regardless of such a classification depending on, for example, rolling mill capacity as long as a specified size is obtained. It is preferable that hot rolling be performed under the conditions described below.

Finish rolling temperature: 800° C. or higher and 950° C. or lower is preferable. By controlling the finish rolling temperature to be 800° C. or higher, there is a tendency for the microstructure of a hot-rolled coil to be homogeneous. Controlling the microstructure at this stage to be homogeneous contributes to homogenizing the microstructure of a final product. In the case where a microstructure is inhomogeneous, there is deterioration in ductility and processability such as bendability and stretch flange formability. On the other hand, in the case where the finish rolling temperature is higher than 950° C., since there is an increase in the amount of oxides (scale) formed, there is an increase in the degree of asperity of an interface between the base steel and the oxides, which may result in a deterioration in the surface quality after pickling or cold rolling has been performed.

In addition, there is an increase in the crystal grain diameter of a microstructure, which may result in deterioration in the strength and processability such as bendability and stretch flange formability of a steel sheet as in the case of a steel slab. After hot rolling has been performed as described above, for the purpose of the refinement and homogenization of a microstructure, it is preferable that cooling be started within 3 seconds after finish rolling has been performed and that cooling be performed at an average cooling rate of 10° C./s to 250° C./s in a temperature region from [finish rolling temperature] ° C. to [finish rolling temperature−100] ° C.

The coiling temperature is preferably set to 450 to 700° C. Setting the temperature immediately before coiling after hot rolling, that is, the coiling temperature to more than or equal to 450° C. is preferable from the viewpoint of fine precipitation of a carbide when Nb or the like is added, and setting the coiling temperature to less than or equal to 700° C. is preferable because a cementite precipitate does not become too coarse. If the coiling temperature is in a temperature region of less than 450° C. or more than 700° C., the structure is likely to change during holding after coiling in a coil, and rolling trouble etc. due to the non-uniformity of the metal structure of the material are likely to occur in cold rolling of a later step. From the viewpoints of grain size adjustment of the hot rolled sheet structure etc., the coiling temperature is more preferably set to more than or equal to 500° C. and less than or equal to 680° C.

Subsequently, cold rolling step is performed. Here, the hot-rolled steel sheet is usually made into a cold-rolled coil by performing cold rolling following pickling for the purpose of descaling. Such pickling is performed as needed.

It is preferable that cold rolling be performed with a rolling reduction ratio of 20% or more. This is for the purpose of forming a homogeneous and fine microstructure in the subsequent heating process. In the case where the rolling reduction ratio is less than 20%, since there may be a case where a microstructure having a large grain diameter or an inhomogeneous microstructure is formed when heating is performed, there is a risk of a deterioration in the strength and processability of a final product sheet after the subsequent heat treatment has been performed as described above, and the surface appearance quality may also be deteriorated. Although there is no particular limitation on the upper limit of the rolling reduction ratio, there may be a case of deterioration in productivity due to a high rolling load and deterioration in shape in the case where a high-strength steel sheet is subjected to cold rolling with a high rolling reduction ratio. It is preferable that rolling reduction ratio be 90% or less.

The above is a method for manufacturing a cold rolled material.

In the annealing step, a cold rolled material having the component composition is heated in the following atmosphere within an annealing furnace with a hydrogen concentration H of more than or equal to 1 vol % and less than or equal to 13 vol %, at a temperature within an annealing furnace T of (an $A_{c3}$ point−20° C.) to less than or equal to 900° C. for more than or equal to 5 seconds, then cooled, and allowed the cold rolled material to stay in a temperature region of 400 to 550° C. for more than or equal to 10 s.

The average heating rate for bringing the temperature within an annealing furnace T within the temperature region of (the $A_{c3}$ point−20° C.) to less than or equal to 900° C. is not particularly limited, but the average heating rate is preferably less than 10° C./s for the reason of the homogenization of the structure. Further, the average heating rate is preferably more than or equal to 1° C./s from the viewpoint of suppressing the reduction in manufacturing efficiency.

The heating temperature (temperature within an annealing furnace) T is set to (the Ac3 point−20° C.) to 900° C. in order to guarantee both material quality and coatability. If the heating temperature is less than (the $A_{c3}$ point−20° C.), the finally obtained metal structure has a high ferrite fraction and consequently cannot obtain strength, and has limited production of bainite. In addition, it is not preferable that the heating temperature be higher than 900° C., because this results in deterioration in processability such as bendability and stretch flange formability due to increased crystal grain diameter. In addition, in the case where the heating temperature is higher than 900° C., since Mn and Si tend to be concentrated in the surface layer, there is deterioration in coatability. In addition, in the case where the heating temperature is higher than the Ac3 point and higher than 900° C., since a load placed on the equipment is stably high, there may be a case where manufacturing is not possible.

In the manufacturing method according to aspects of the present invention, heating is performed at the temperature of the temperature within an annealing furnace T of (the $A_{c3}$ point−20° C.) to 900° C. for more than or equal to 5 seconds. The heating time is preferably less than or equal to 180 seconds for the reason of preventing the coarsening of excess austenite grain diameters. The heating time is set to more than or equal to 5 seconds from the viewpoint of the homogenization of the structure.

The hydrogen concentration H in the temperature region of (the $A_{c3}$ point−20° C.) to 900° C. is set to 1 to 13 vol %. In accordance with aspects of the present invention, not only the heating temperature described above but also the atmosphere within a furnace is simultaneously controlled; thereby, coatability is guaranteed, and at the same time the entry of excess hydrogen into the steel is prevented. If the hydrogen concentration is less than 1 vol %, coating defect often occurs. At hydrogen concentrations more than 13 vol %, the effect for coatability is saturated, and at the same time the entry of hydrogen into the steel is considerably increased and hydrogen embrittlement resistance of the final product are degraded.

Outside the temperature region of (the $A_{c3}$ point−20° C.) to 900° C. mentioned above, the hydrogen concentration may not be in the range of more than or equal to 1 vol %.

When performing cooling after staying in the hydrogen concentration atmosphere mentioned above, the workpiece is allowed to stay in the temperature region of 400 to 550° C. for more than or equal to 10 s. This is in order to promote the production of bainite and reducing the amount of hydrogen in steel. As the prescription of the metal structure, bainite is an important structure to obtain high YS. To produce bainite and making the area ratio of bainite more than or equal to 20% of hard phase, it is necessary to allow the workpiece to stay in this temperature region for more than or equal to 10 s. Staying at less than 400° C. is not preferable because the temperature is likely to be below the coating bath temperature subsequently used and the quality of the coating bath is reduced. In this case, the sheet temperature may be raised up to the coating bath temperature by heating; thus, the lower limit of the temperature region mentioned above is set to 400° C. On the other hand, in the case where the retention temperature is higher than 550° C., ferrite and pearlite are more likely to be formed than bainite. It is preferable that a cooling be performed at a cooling rate (average cooling rate) of 3° C./s or more from the heating temperature to this temperature region. This is because, since ferrite transformation tends to occur in the case where the cooling rate is less than 3° C./s, there may be a case where to form the desired metal structure is not possible. There is no particular limitation on the upper limit of the preferable cooling rate. Although the cooling may be stopped in the above-described temperature region of 400° C. to 550° C., the steel sheet may be held in a temperature region of 400° C. to 550° C. after having been subjected to cooling to a temperature equal to or lower than the temperature region followed by reheating. In this case, there may be a case where martensite is formed and then tempered if cooling is performed to a temperature equal to or lower than the Ms point.

In a coating step, coating treatment and alloying treatment are performed for a steel sheet after the annealing, and cooling up to less than or equal to 100° C. at an average cooling rate of more than or equal to 3° C./s is performed.

In the coating treatment and the alloying treatment, the coating weight per one surface is set to 20 to 120 g/m². Further, the content amount of Fe is 8 to 15% in mass %. As mentioned above, the galvanizing layer having a content amount of Fe in the range mentioned above is an alloyed hot-dip galvanizing layer. The galvanizing layer contains Al: 0.001% to 1.0%, other than Fe. Further, as mentioned above, the galvanizing layer contains a prescribed amount of Mn oxides, and therefore contains Mn. The galvanizing layer may contain one or two or more selected from Pb, Sb, Si, Sn, Mg, Mn, Ni, Cr, Co, Ca, Cu, Li, Ti, Be, Bi, and the REMs at 0 to 30% in total. The balance is Zn and unavoidable impurities.

The method of coating treatment is preferably hot-dip galvanizing treatment. The conditions may be set as appropriate. Further, alloying treatment of performing heating after hot-dip galvanization is performed. Examples include a treatment of holding in the temperature region of 480 to 600° C. for approximately 1 to 60 seconds. By this treatment, a galvannealed layer having a content amount of Fe of 8 to 15% is obtained.

After the alloying treatment mentioned above, cooling is performed up to less than or equal to 100° C. at an average cooling rate of more than or equal to 3° C./s. This is in order to obtain martensite essential for strength increase. This is because cooling rates of less than 3° C./s make it difficult to obtain martensite necessary for strength, and stopping cooling at a temperature higher than 100° C. leads to a situation where martensite is excessively tempered (self-tempered) at this time point and austenite does not become martensite but transforms to ferrite, and necessary strength is difficult to obtain.

After the annealing step, a post heat treatment step is performed. The post heat treatment step is a step for allowing a coated steel sheet after the coating step to stay in an atmosphere within a furnace with a hydrogen concentration H of less than or equal to 10 vol % and a dew point Dp of less than or equal to 50° C., at a temperature T (° C.) of more than or equal to 200° C. and less than or equal to 350° C. for more than or equal to a time t (hr) that is more than or equal to 0.005 (hr) and satisfies the formula (1):

$$130-18.3\times ln(t) \leq T \tag{1}.$$

The post heat treatment step is performed in order to obtain high yield strength and further in order to reduce the amount of diffusible hydrogen in the steel. The increase in the amount of diffusible hydrogen in the steel can be suppressed by creating an atmosphere within a furnace with a hydrogen concentration H of less than or equal to 10 vol % and a dew point Dp of less than or equal to 50° C. The hydrogen concentration H is preferably smaller, and is preferably less than or equal to 5 vol %, more preferably less than or equal to 2 vol %. The lower limit of the hydrogen concentration H is not particularly limited, and is preferably smaller as mentioned above; however, a preferred lower limit is more than or equal to 1 vol % because it is difficult to excessively reduce the hydrogen concentration. Further, to obtain the effects mentioned above, the dew point Dp is preferably less than or equal to 45° C., and more preferably less than or equal to 40° C. The lower limit of the dew point Dp is not particularly limited, but is preferably more than or equal to −80° C. from the viewpoint of manufacturing cost.

If the temperature for staying is a temperature more than 350° C., a reduction in tensile strength, the degradation of the coating layer, and the degradation of the external appearance occur; thus, the upper limit of the temperature is set to 350° C. The upper limit is preferably less than or equal to 340° C., and more preferably less than or equal to 330° C. If the lower limit of the temperature for staying is less than 200° C., YR is not enhanced. Further, it is difficult to sufficiently reduce the amount of diffusible hydrogen in the steel, and welding cracking occurs. Thus, the lower limit of the temperature mentioned above is set to 200° C. The lower limit is preferably more than or equal to 210° C., and more preferably more than or equal to 220° C.

To reduce the amount of hydrogen in the steel, it is important to make not only the temperature but also the time appropriate. By adjusting the time for staying such that it is more than or equal to 0.005 hr and satisfies the formula (1), the amount of diffusible hydrogen in the steel can be reduced, and high yield strength can be obtained.

The above is a method for manufacturing the high-strength galvanized steel sheet according to aspects of the present invention; however, after the cold rolling mentioned above and before annealing, a pretreatment step in which the cold rolled sheet obtained by cold rolling is heated in the temperature region of the $A_{c3}$ point to $A_{c3}$ point+50° C. and pickling may be performed.

Heating to a Temperature Region from the $A_{c1}$ Point to the $A_{c3}$ Point+50° C.

"Heating to a temperature region from the $A_{c1}$ point to the $A_{c3}$ point+50° C." is the condition for achieving high yield strength and satisfactory coatability by formation of the steel structure in a final product. It is preferable that a microstructure including ferrite and martensite be formed before the subsequent heat treatment process from the viewpoint of material properties. Moreover, it is also preferable that the oxides of, for example, Mn be concentrated in the surface layer of a steel sheet through this heating process from the viewpoint of coatability. From such points of view, heating is performed to a temperature region from the $A_{c1}$ point to the $A_{c3}$ point+50° C. Here, regarding the $A_{c1}$ and $A_{c3}$ described above, values obtained in the following equations are used.

$$A_{c1}=751-27C+18Si-12Mn-23Cu-23Ni+24Cr+23Mo-40V-6Ti+32Zr+233Nb-169Al-895B$$

$$A_{c3}=910-203(C)^{1/2}+44.7Si-30Mn-11P+700S+400Al+400Ti$$

where the atomic symbols in the equations above respectively denote the contents of the corresponding chemical elements, and where the symbol of a chemical element which is not contained is assigned a value of 0.

In the above pickling after heating, in order to achieve satisfactory coatability by performing heating in a temperature region equal to or higher than the $A_{c3}$ point in the subsequent heat treatment process, the oxides of, for example, Si and Mn, which have been concentrated in the surface layer of the steel sheet, are removed by performing pickling.

Further, temper rolling may be performed after the coating step.

Temper rolling is performed at an extension rate of more than or equal to 0.1% after the cooling of the coating step. Temper rolling may not be performed. Temper rolling is performed on the coated steel sheet with an extension rate of 0.1% or more for the purpose of stably achieving an YS in addition to correcting the shape and controlling the surface roughness. Processing through the use of leveler may be performed in addition to temper rolling for the purpose of correcting the shape and controlling the surface roughness. In the case where temper rolling is performed more than necessary, since excessive strain is applied to the surface of a steel sheet, there is a decrease in the evaluation values of ductility and stretch flange formability. In addition, in the case where temper rolling is performed more than necessary, there is deterioration in ductility, and there is an increase in load placed on the equipment due to the high strength of the steel sheet. Therefore, it is preferable that temper rolling be performed with a rolling reduction ratio of 3% or less.

It is preferable to perform width trimming before or after the temper rolling mentioned above. Coil width adjustment can be performed by the width trimming. Further, by performing width trimming before the post heat treatment step as mentioned below, hydrogen in steel can be released efficiently in the post heat treatment subsequently performed.

Width trimming is preferably performed before the post heat treatment step. In a case where width trimming is performed before the post heat treatment step, a staying time t (hr) for staying at a temperature T (° C.) of more than or equal to 200° C. and less than or equal to 350° C. in the post heat treatment step may be more than or equal to 0.005 (hr) and satisfy a formula (2), $$115-18.3\times ln(t) \leq T \tag{2}.$$

As is clear from the formula (2), as compared to the case of the formula (1), the time can be shortened when the temperature condition is the same, and the temperature can be lowered when the condition of the staying time is the same.

Example 1

Molten steel of the composition shown in Table 1 was smelted with a converter, and was fashioned into a slab by a continuous casting machine. The slab was heated to 1200° C., and was fashioned into a hot rolled coil by using a finish rolling temperature of 840° C. and a coiling temperature of 610° C. The hot rolled coil was processed with a cold rolling reduction ratio of 50% into a cold rolled material with a sheet thickness of 1.4 mm. The cold rolled material was heated up to 810° C. (in the range of (the Ac3 point−20° C.) to 900° C.) by annealing treatment in an atmosphere within an annealing furnace with a hydrogen concentration of 9 vol % and a dew point of −30° C., was allowed to stay for 60 seconds, was then cooled down to 500° C., and was allowed to stay for 50 seconds. After that, galvanization was performed and alloying treatment was performed; after the coating, the workpiece was passed through a water tank at a water temperature of 40° C. to be cooled down to less than or equal to 100° C., with the average cooling rate set to 3° C./s; thus, a high-strength galvannealed steel sheet (a product sheet) was manufactured. Here, the content amount of Fe and the coating amount of the coating layer were adjusted so as to be within the range of the invention of the present application. After that, a post heat treatment was performed with various temperatures and times in an atmosphere within a furnace with a hydrogen concentration of 0 vol % and a dew point of −10° C. Temper rolling was performed after the coating, with the extension rate set to 0.2%. Width trimming was not performed.

Samples were cut out from each steel sheet, and were subjected to the analysis of hydrogen in the steel and the evaluation of nugget cracking of welds as the evaluation of hydrogen embrittlement resistance. The results are shown in the FIGURE.

Amount of Hydrogen in Steel

The amount of hydrogen in the steel was measured by the following method. First, an approximately 5×30 mm test piece was cut out from the alloyed galvanized steel sheet subjected to up to the post heat treatment. Next, a router was used to remove the coating on a surface of the test piece, and the test piece was put into a quartz tube. Next, the interior of the quartz tube was substituted with Ar, then the temperature was raised at 200° C./hr, and hydrogen generated until reaching 400° C. was measured with a gas chromatograph. In this way, the amount of hydrogen released was measured by the programed temperature analysis method. The cumulative value of the amount of hydrogen detected in the temperature region of room temperature (25° C.) to less than 210° C. was taken as the amount of diffusible hydrogen.

Hydrogen Embrittlement Resistance

Nugget cracking of resistance spot welds of steel sheets was evaluated as the evaluation of hydrogen embrittlement resistance. In the evaluation method, sheets each with a sheet thickness of 2 mm were placed as spacers individually between both ends of 30×100 mm sheets, and the centers between the spacers were joined together by spot welding; thus, a test piece was fabricated. At this time, for the spot welding, an inverter DC resistance spot welding machine was used, and a dome-form electrode made of chromium-copper and having a tip diameter of 6 mm was used as the electrode. The welding pressure was set to 380 kgf, the welding time to 16 cycles/50 Hz, and the holding time to 5 cycles/50 Hz. The welding current value was changed, and samples with various nugget diameters were produced.

The spacing between the spacers at both ends was set to 40 mm, and the steel sheets and the spacers were lashed by welding in advance. After the welding, the test piece was allowed to stand for 24 hours, then the spacer portions were cut off and the cross-sectional observation of the weld nuggets was performed to evaluate the presence or absence of cracking (crevices) due to hydrogen embrittlement, and the smallest nugget diameter out of the nugget diameters having no crevice was found. The FIGURE shows a relationship between the amount of diffusible hydrogen and the smallest nugget diameter.

As shown in the FIGURE, when the amount of diffusible hydrogen in the steel exceeds 0.20 mass ppm, the smallest nugget diameter increases rapidly, and the smallest nugget diameter exceeds 4 and degrades.

In the case where the amount of diffusible hydrogen is in the range of the present invention, also the steel structure etc. are in the ranges of the present invention.

TABLE 1

| | mass % | | | | | | | | | |
|---|---|---|---|---|---|---|---|---|---|---|
| Steel No. | C | Si | Mn | P | S | N | Al | Ti | Nb | B | Ca |
| B | 0.135 | 0.30 | 2.75 | 0.007 | 0.0007 | 0.0038 | 0.042 | 0.022 | 0.025 | 0.0023 | 0.0001 |

Example 2

Various kinds of molten steel of the component compositions shown in Table 2 were smelted with a converter, and each was fashioned into a slab by a continuous casting machine; then, hot rolling, cold rolling, heating (annealing), pickling (in the case of "o" in Table 2, a pickling liquid in which the HCl concentration was adjusted to 5 mass % and the liquid temperature to 60° C. was used), heat treatment and coating treatment, temper rolling, coil width trimming, and a post heat treatment were performed under the various conditions shown in Table 2; thus, high-strength galvanized steel sheets (product sheets) each with a thickness of 1.4 mm were manufactured. The cooling (cooling after coating treatment) was performed up to less than or equal to 100° C. by passing the workpiece through a water tank at a water temperature of 40° C.

By taking samples from the galvanized steel sheets obtained as described above, and by performing steel structure observation and a tensile test through the use of the methods described below, phase fraction (area ratio) of a structure, yield strength (YS), tensile strength (TS), and yield strength ratio (YR=YS/TS) were determined or calculated. Further, the external appearance was visually observed to evaluate coatability (surface appearance quality). The evaluation method is as follows.

Microstructure Observation

By taking a sample for microstructure observation from the galvanized steel sheet, by polishing an L-cross section (thickness cross section parallel to the rolling direction), by etching the polished cross section through the use of a nital solution, by performing observation through the use of a SEM at a magnification of 1500 times in 3 or more fields of view in the vicinity of a position located ¼ t (t denotes a whole thickness) from the surface in the etched cross section in order to obtain image data, and by performing image analysis on the obtained image data, area ratio was determined for each of the observed fields of view, and average value of the determined area ratios was calculated. However, the volume ratio of retained austenite (the volume ratio is regarded as the area ratio) was quantified by the intensity of X-ray diffraction. F of Table 4 stands for ferrite, M for quenched martensite, M' for tempered martensite, B for bainite, and Residual γ for retained austenite.

In the structure observation mentioned above, pearlite and aggregations of precipitates and inclusions were observed as other phases in some examples.

Tensile Test

A tensile test was performed with a constant tensile speed (crosshead speed) of 10 mm/min on a JIS No. 5 tensile test piece (JIS Z 2201) taken from the galvanized steel sheet in a direction rectangular to the rolling direction. The yield strength (YS) was defined as 0.2% proof stress which was derived from the inclination in the elastic range corresponding to a strain of 150 MPa to 350 MPa, and the tensile strength was defined as the maximum load in the tensile test divided by the initial cross-sectional area of the parallel part of the test piece. When the cross-sectional area of the parallel part was calculated, the thickness was defined as the thickness including that of the coating layer.

Surface Quality (Appearance)

After a coating treatment, visual observation on the appearance after a heat treatment had been performed, a case where no bare spot was observed was judged as o, a case where bare spots were observed was judged as x, a case where no bare spot was observed but, for example, a variation in coating appearance was observed was judged as Δ. Here, the term "bare spots" denotes areas having a size of about several micrometers to several millimeters in which no coating layer exists so that the steel sheet is exposed.

Amount of Diffusible Hydrogen in Steel

The measurement of the amount of diffusible hydrogen in the steel was performed by a similar method to Example 1.

Amount of Mn Oxides in Galvanizing Layer

In the measurement of the amount of Mn oxides in the galvanizing layer, the amount of Mn oxides in the galvanizing layer was measured by dissolving the coating layer in dilute hydrochloric acid in which an inhibitor was added and using the ICP emission spectroscopic analysis method.

Hydrogen Embrittlement Resistance

Hydrogen embrittlement resistance properties of resistance spot welds of steel sheets were evaluated as the evaluation of hydrogen embrittlement resistance. The method of evaluation is similar to the one of the Example 1. As the welding current value, a condition whereby a nugget diameter according to the strength of each steel sheet was to be formed was used. A nugget diameter of 3.8 mm was employed for 1100 to 1250 MPa, a nugget diameter of 4.8 mm for 1250 to 1400 MPa, and a nugget diameter of 6 mm for more than or equal to 1400 MPa. Similar to Example 1, the spacing between the spacers at both ends was set to 40 mm, and the steel sheets and the spacers were lashed by welding in advance. After the welding, the test piece was allowed to stand for 24 hours, then the spacer portions were cut off and the cross-sectional observation of the weld nugget was performed to evaluate if there is cracking. In the table, no crevice being present is shown by "o", and a crevice being present is shown by "x".

The obtained results are shown in Table 4. Invention Examples were good in all of TS, YR, surface appearance quality, and weldability. Comparative Examples were poor in any of these. Further, from comparison between Invention Examples and Comparative Examples, it can be seen that the relationship between the amount of diffusible hydrogen and weldability is similar to the FIGURE within the ranges of the component composition and the steel structure according to aspects of the present invention and that, when the amount of diffusible hydrogen is less than or equal to 0.20 mass ppm, the evaluation of resistance spot weld nugget cracking is good as hydrogen embrittlement resistance.

TABLE 2

| Steel No. | C | Si | Mn | P | S | N | Al | Ti | Nb | V | Zr |
|---|---|---|---|---|---|---|---|---|---|---|---|
| A | 0.110 | 0.02 | 2.65 | 0.010 | 0.0008 | 0.0040 | 0.035 | | | | |
| B | 0.135 | 0.30 | 2.75 | 0.007 | 0.0007 | 0.0038 | 0.042 | 0.022 | 0.025 | | |
| C | 0.125 | 0.20 | 2.50 | 0.009 | 0.0011 | 0.0048 | 0.050 | | | | |
| D | 0.125 | 0.20 | 2.50 | 0.009 | 0.0011 | 0.0048 | 0.050 | 0.015 | | | |
| E | 0.125 | 0.20 | 2.50 | 0.009 | 0.0011 | 0.0048 | 0.050 | | | 0.012 | 0.022 |
| F | 0.125 | 0.20 | 2.50 | 0.009 | 0.0011 | 0.0048 | 0.050 | 0.035 | 0.062 | | |
| G | 0.125 | 0.20 | 2.50 | 0.009 | 0.0011 | 0.0048 | 0.050 | | | | |
| H | 0.125 | 0.20 | 2.50 | 0.009 | 0.0011 | 0.0048 | 0.050 | | | | |
| I | 0.125 | 0.20 | 2.50 | 0.009 | 0.0011 | 0.0048 | 0.050 | | | | |
| J | 0.140 | 0.15 | 2.45 | 0.009 | 0.0006 | 0.0039 | 0.036 | 0.025 | 0.028 | | |
| K | 0.250 | 0.60 | 2.10 | 0.009 | 0.0009 | 0.0050 | 0.035 | 0.025 | 0.020 | | |
| L | 0.185 | 0.50 | 3.05 | 0.005 | 0.0005 | 0.0035 | 0.052 | 0.034 | 0.033 | 0.005 | |
| M | 0.080 | 0.40 | 2.05 | 0.008 | 0.0015 | 0.0040 | 0.035 | | 0.025 | | |
| N | 0.160 | 0.10 | 1.85 | 0.010 | 0.0010 | 0.0040 | 0.030 | 0.018 | 0.023 | | |
| O | 0.160 | 1.40 | 2.30 | 0.010 | 0.0009 | 0.0039 | 0.030 | 0.025 | 0.020 | | |

| Steel No. | B | Mo | Cr | Cu | Ni | Sb | Sn | Ca | Note |
|---|---|---|---|---|---|---|---|---|---|
| A | | | | | | | | | Example |
| B | 0.0023 | | | | | | | 0.0001 | Example |
| C | | | | | | | | 0.0001 | Example |
| D | | | | | | | | 0.0001 | Example |
| E | | | | | | | | 0.0001 | Example |
| F | | 0.2 | | | | | | 0.0001 | Example |
| G | | | | 0.20 | 0.10 | | | 0.0001 | Example |
| H | | | | | | 0.012 | | 0.0001 | Example |
| I | | | | | | | 0.006 | 0.0001 | Example |
| J | 0.0018 | 0.10 | | | | | | | Example |
| K | | | 0.12 | | | | | | Example |

TABLE 2-continued

| | | mass % | | | |
|---|---|---|---|---|---|
| | L | | | 0.0080 | Example |
| | <u>M</u> | 0.0010 | | | Comparative Example |
| | <u>N</u> | 0.0010 | 0.10 | 0.1 | Comparative Example |
| | <u>O</u> | | 0.12 | | Comparative Example |

*Underlined portions indicate values out of the range of the present invention.

TABLE 3

| No. | Steel No. | Hot rolling | | | Cold rolling | | | Annealing | | | |
|---|---|---|---|---|---|---|---|---|---|---|---|
| | | Slab heating temperature (°C.) | Finish rolling temperature (°C.) | Coiling temperature (°C.) | Cold rolling reduction ratio (%) | Heating temperature (°C.) | Pickling done or undone | Hydrogen concentration in a furnace (vol. %) | Temperature T (°C.) | Retention time*1 (s) | Retention time*2 (s) |
| 1 | A | 1280 | 920 | 520 | 60 | — | — | 3 | 830 | 110 | 15 |
| 2 | B | 1200 | 840 | 610 | 50 | 830 | ○ | 7 | 810 | 60 | 40 |
| 3 | C | 1250 | 890 | 570 | 50 | — | — | 10 | 820 | 50 | 30 |
| 4 | D | 1250 | 890 | 570 | 50 | — | — | 10 | 820 | 60 | 30 |
| 5 | F | 1250 | 890 | 570 | 50 | — | — | 10 | 820 | 35 | 30 |
| 6 | E | 1250 | 890 | 580 | 50 | — | — | 10 | 820 | 60 | 30 |
| 7 | G | 1250 | 890 | 570 | 50 | — | — | 10 | 820 | 60 | 30 |
| 8 | H | 1250 | 890 | 570 | 50 | — | — | 10 | 820 | 60 | 30 |
| 9 | I | 1250 | 890 | 570 | 50 | — | — | 10 | 820 | 60 | 30 |
| 10 | J | 1200 | 880 | 580 | 50 | — | — | 5 | 805 | 70 | 20 |
| 11 | J | 1200 | 880 | 580 | 50 | 820 | — | 5 | 805 | 70 | 20 |
| 12 | J | 1200 | 880 | 580 | 50 | 820 | ○ | 5 | 805 | 70 | 20 |
| 13 | J | 1200 | 880 | 580 | 50 | — | — | 5 | <u>735</u> | 70 | 20 |
| 14 | J | 1200 | 880 | 580 | 50 | — | — | 5 | <u>920</u> | 70 | 20 |
| 15 | J | 1200 | 880 | 580 | 50 | — | — | <u>0</u> | 805 | 70 | 20 |
| 16 | J | 1200 | 880 | 580 | 50 | — | — | <u>20</u> | 805 | 70 | 20 |
| 17 | J | 1200 | 880 | 580 | 50 | — | — | 5 | 805 | 70 | 20 |
| 18 | J | 1200 | 880 | 580 | 50 | — | — | 5 | 805 | 70 | <u>5</u> |
| 19 | J | 1200 | 880 | 580 | 50 | — | — | 5 | 805 | 70 | 20 |
| 20 | J | 1200 | 880 | 580 | 50 | — | — | 5 | 805 | 70 | 20 |
| 21 | J | 1200 | 880 | 580 | 50 | — | — | 10 | 805 | 70 | 20 |
| 22 | J | 1200 | 880 | 580 | 50 | — | — | 5 | 805 | 70 | 20 |
| 23 | J | 1200 | 880 | 580 | 50 | — | — | 5 | 805 | 70 | 20 |
| 24 | J | 1200 | 880 | 580 | 50 | — | — | 5 | 805 | 70 | 20 |
| 25 | J | 1200 | 880 | 580 | 50 | — | — | 5 | 805 | 70 | 20 |
| 26 | K | 1200 | 880 | 550 | 50 | — | — | 3 | 820 | 60 | 25 |
| 27 | K | 1200 | 880 | 550 | 50 | 820 | ○ | 3 | 820 | 60 | 25 |
| 28 | L | 1230 | 870 | 640 | 50 | 830 | ○ | 5 | 810 | 60 | 25 |
| 29 | <u>M</u> | 1250 | 860 | 550 | 30 | — | — | 7 | 820 | 60 | 20 |
| 30 | <u>N</u> | 1200 | 880 | 560 | 50 | — | — | 7 | 850 | 60 | 20 |
| 31 | <u>O</u> | 1220 | 890 | 560 | 50 | 820 | ○ | 7 | 860 | 60 | 30 |

| No. | Average cooling rate after coating treatment*3 (°C./s) | Skin pass rolling Elongation ratio (%) | With trimming Done/ Undone *4 | Post heat treatment | | | | Note |
|---|---|---|---|---|---|---|---|---|
| | | | | Hydrogen concentration (vol. %) | Dew-point D (°C.) | Holding temperature T (°C.) | Time t (hr) | |
| 1 | 8 | 0.3 | — | 5 | −10 | 300 | 6 | Example |
| 2 | 6 | 0.2 | — | 1 | 0 | 220 | 2 | Example |
| 3 | 7 | 0.15 | — | 0 | −5 | 250 | 1 | Example |
| 4 | 7 | 0.2 | — | 0 | −5 | 250 | 1 | Example |
| 5 | 7 | 0.2 | — | 0 | −5 | 250 | 1 | Example |
| 6 | 7 | 0.2 | — | 0 | −5 | 230 | 0.006 | Example |
| 7 | 7 | 0.2 | — | 0 | −5 | 250 | 1 | Example |
| 8 | 7 | 0.2 | — | 0 | −5 | 250 | 1 | Example |
| 9 | 7 | 0.2 | — | 0 | −5 | 250 | 1 | Example |
| 10 | 5 | 0.3 | — | 1 | −10 | 200 | 18 | Example |
| 11 | 5 | 0.3 | — | 1 | −10 | 200 | 18 | Comparative Example |
| 12 | 5 | 0.3 | — | 1 | −10 | 200 | 18 | Example |

TABLE 3-continued

| | | | | | | | | | |
|---|---|---|---|---|---|---|---|---|---|
| | 13 | 5 | 0.3 | | 1 | −10 | 200 | 18 | Comparative Example |
| | 14 | 5 | 0.3 | — | 1 | −10 | 200 | 18 | Comparative Example |
| | 15 | 5 | 0.3 | — | 1 | −10 | 200 | 18 | Comparative Example |
| | 16 | 5 | 0.3 | — | 1 | −10 | 200 | 18 | Comparative Example |
| | 17 | 5 | 0.3 | — | 1 | <u>60</u> | 200 | 18 | Comparative Example |
| | 18 | 5 | 0.3 | — | 1 | −10 | 200 | 0.03 | Comparative Example |
| | 19 | <u>1</u> | 0.3 | — | 1 | −10 | 200 | 18 | Comparative Example |
| | 20 | 5 | 0.3 | — | 1 | −10 | <u>120</u> | 2 | Comparative Example |
| | 21 | 5 | 0.3 | — | 1 | −10 | <u>450</u> | 0.1 | Comparative Example |
| | 22 | 5 | 0.3 | — | 1 | −10 | 200 | <u>0.015</u> | Comparative Example |
| | 23 | 5 | 0.3 | ○ | 1 | −10 | 200 | 0.01 | Example |
| | 24 | 5 | 0.3 | — | 1 | −10 | 210 | 0.015 | Example |
| | 25 | 5 | 0.3 | — | 1 | −10 | 210 | <u>0.010</u> | Comparative Example |
| | 26 | 6 | 0.1 | — | 0 | 0 | 200 | 24 | Example |
| | 27 | 6 | 0.1 | — | 0 | 0 | 200 | 24 | Example |
| | 28 | 6 | 0.1 | — | 1 | 0 | 210 | 3 | Example |
| | 29 | 6 | 0.2 | — | 2 | −5 | 200 | 1 | Comparative Example |
| | 30 | 6 | 0.2 | — | 2 | −5 | 200 | 1 | Comparative Example |
| | 31 | 6 | 0.2 | — | 1 | −5 | 200 | 1 | Comparative Example |

*Underlined portions indicate values out of the range of the present invention.
*1 This refers to a retention time in a temperature range of Ac3 point −20° C. to 900° C.
*2 This refers to a retention time in a temperature range of 400° C. to 550° C. before coating.
*3 The average cooling rate after coating is the average cooling rate in the temperature region from approximately 450° C., which is after coating, to 100° C., which is after passing the workpiece through the last cooling zone. The last stage of the cooling was performed such that the temperature became less than or equal to 50° C. by passing the workpiece through a water tank at a water temperature of 40° C.
*4 ○ stands for width trimming after the post treatment step.

TABLE 4

| | | Metal structure | | | | Product sheet | | | | Coating | | | Amount of diffusible hydrogen mass ppm | Hydrogen embrittlement resistance Presence or absence of crevice | Note |
|---|---|---|---|---|---|---|---|---|---|---|---|---|---|---|---|
| | | M, B, in hard phase | | Remainder | | | | | | Coating | | | | | |
| No. | Steel No. | M' % | B % | F % | Y % | TS MPa | YS MPa | YR YS/TS | Surface quality | Coating weight g/m² | Fe % | Mn oxides g/m² | | | |
| 1 | A | 94 | 25 | 5 | 0 | 1120 | 990 | 0.88 | ○ | 25 | 10 | 0.040 | 0.03 | ○ | Example |
| 2 | B | 82 | 30 | 10 | 1 | 1230 | 1050 | 0.85 | ○ | 46 | 12 | 0.040 | 0.08 | ○ | Example |
| 3 | C | 93 | 25 | 2 | 1 | 1150 | 980 | 0.85 | ○ | 45 | 9 | 0.030 | 0.06 | ○ | Example |
| 4 | D | 91 | 25 | 8 | 1 | 1180 | 1030 | 0.87 | ○ | 45 | 10 | 0.030 | 0.04 | ○ | Example |
| 5 | E | 90 | 35 | 9 | 1 | 1200 | 1030 | 0.86 | ○ | 45 | 11 | 0.030 | 0.04 | ○ | Example |
| 6 | F | 80 | 30 | 18 | 0 | 1255 | 1090 | 0.87 | ○ | 45 | 10 | 0.010 | 0.07 | ○ | Example |
| 7 | G | 95 | 30 | 4 | 1 | 1240 | 1060 | 0.85 | ○ | 45 | 10 | 0.030 | 0.05 | ○ | Example |
| 8 | H | 96 | 30 | 3 | 1 | 1155 | 980 | 0.85 | ○ | 45 | 10 | 0.030 | 0.05 | ○ | Example |
| 9 | I | 96 | 25 | 3 | 1 | 1155 | 985 | 0.85 | ○ | 45 | 10 | 0.030 | 0.06 | ○ | Example |
| 10 | J | 96 | 30 | 3 | 0 | 1250 | 1060 | 0.85 | ○ | 42 | 11 | 0.030 | 0.11 | ○ | Example |
| 11 | J | 95 | 30 | 4 | 0 | 1235 | 1050 | 0.85 | × | <u>18</u> | — | — | — | — | Comparative Example |
| 12 | J | 95 | 30 | 4 | 0 | 1255 | 1075 | 0.86 | ○ | 42 | 11 | 0.030 | 0.11 | ○ | Example |
| 13 | J | <u>55</u> | 30 | <u>45</u> | 0 | <u>1050</u> | 680 | <u>0.65</u> | ○ | 42 | 9 | 0.030 | — | — | Comparative Example |
| 14 | J | 98 | 30 | 2 | 0 | 1330 | 1170 | 0.88 | × | <u>8</u> | — | — | — | — | Comparative Example |
| 15 | J | 95 | 30 | 4 | 0 | 1250 | 850 | <u>0.68</u> | × | <u>3</u> | — | — | — | — | Comparative Example |
| 16 | J | 96 | 30 | 4 | 0 | 1250 | 1065 | 0.85 | ○ | 46 | 15 | 0.010 | <u>0.25</u> | × | Comparative Example |
| 17 | J | 96 | 30 | 4 | 0 | 1250 | 1060 | 0.85 | Δ | 42 | 10 | 0.020 | <u>0.22</u> | × | Comparative Example |
| 18 | J | 94 | 15 | 4 | 0 | 1250 | 1050 | <u>0.84</u> | ○ | 46 | 11 | 0.010 | <u>0.21</u> | × | Comparative Example |

TABLE 4-continued

| | | Metal structure | | | | Product sheet | | | | Coating | | Amount of | Hydrogen embrittlement resistance | |
|---|---|---|---|---|---|---|---|---|---|---|---|---|---|---|---|
| | | M, In hard phase | | Remainder | | | | | | Coating | Mn | diffusible | Presence or | |
| No. | Steel No. | M' % | B % | F % | Y % | TS MPa | YS MPa | YR YS/TS | Surface quality | weight g/m² | Fe % | oxides g/m² | hydrogen mass ppm | absence of crevice | Note |
| 19 | J | <u>68</u> | 30 | <u>32</u> | 0 | <u>1050</u> | 780 | <u>0.74</u> | ○ | 42 | 12 | 0.030 | — | — | Comparative Example |
| 20 | J | 94 | 30 | 4 | 0 | 1250 | 1005 | <u>0.80</u> | ○ | 42 | 13 | 0.030 | <u>0.31</u> | × | Comparative Example |
| 21 | J | 96 | 30 | 3 | 0 | <u>1050</u> | 940 | 0.90 | <u>×</u> | <u>10</u> | — | — | — | — | Comparative Example |
| 22 | J | 95 | 30 | 5 | 0 | 1245 | 1000 | <u>0.80</u> | ○ | 42 | 10 | 0.030 | <u>0.33</u> | × | Comparative Example |
| 23 | J | 95 | 30 | 5 | 0 | 1245 | 1060 | 0.85 | ○ | 43 | 10 | 0.030 | 0.19 | ○ | Example |
| 24 | J | 95 | 30 | 5 | 0 | 1240 | 1060 | 0.85 | ○ | 43 | 10 | 0.030 | 0.18 | ○ | Example |
| 25 | J | 95 | 30 | 5 | 0 | 1240 | 1060 | 0.85 | ○ | 43 | 10 | 0.030 | <u>0.22</u> | × | Comparative Example |
| 26 | K | 97 | 35 | 0 | 3 | 1480 | 1280 | 0.86 | Δ | 30 | 11 | 0.020 | 0.06 | ○ | Example |
| 27 | K | 99 | 35 | 1 | 3 | 1470 | 1270 | 0.86 | ○ | 45 | 10 | 0.020 | 0.06 | ○ | Example |
| 28 | L | 100 | 45 | 0 | 2 | 1370 | 1180 | 0.86 | ○ | 65 | 11 | 0.050 | 0.18 | ○ | Example |
| 29 | M | <u>55</u> | 35 | <u>45</u> | 0 | <u>1020</u> | 870 | 0.85 | ○ | 48 | 11 | 0.030 | 0.09 | — | Comparative Example |
| 30 | N | <u>60</u> | 30 | <u>40</u> | 0 | <u>1070</u> | 905 | 0.85 | ○ | 45 | 10 | 0.020 | 0.11 | — | Comparative Example |
| 31 | O | <u>50</u> | 25 | <u>40</u> | <u>10</u> | 1190 | 1010 | 0.85 | <u>×</u> | <u>10</u> | — | — | — | — | Comparative Example |

*Underlined portions indicate values out of the range of the present invention.
—: It was determined from other properties that evaluation was unnecessary.

INDUSTRIAL APPLICABILITY

The high-strength galvanized steel sheet according to embodiments of the present invention has not only a high tensile strength but also a high yield strength ratio and surface quality and hydrogen embrittlement resistance. For this reason, if aspects of the present invention are applied, they contribute to an improvement in safety performance and to a decrease in the weight of an automobile body through an improvement in strength and a decrease in thickness, in the case where the steel sheet is used for the skeleton parts, in particular, for the parts around a cabin, which has an influence on collision safety, of an automobile body. As a result, aspects of the present invention can contribute to environment conservation, for example, from the viewpoint of $CO_2$ emission. In addition, since the steel sheet has both good surface quality and coating quality, it is possible to actively use for parts such as chassis which are prone to corrosion due to rain or snow. For this reason, according to aspects of the present invention, it is also possible to expect an improvement in the rust prevention capability and corrosion resistance of an automobile body. Such properties can effectively be used not only for automotive parts but also in the industrial fields of civil engineering, construction, and home electrical appliances.

The invention claimed is:

1. A high-strength galvanized steel sheet comprising:
a steel sheet having a steel composition having
a component composition containing, in mass %,
C: more than or equal to 0.10% and less than or equal to 0.30%,
Si: less than 1.2%,
Mn: more than or equal to 2.0% and less than or equal to 3.5%,
P: less than or equal to 0.010%,
S: less than or equal to 0.002%,
Al: less than or equal to 1%,
N: less than or equal to 0.006%, and
the balance including Fe and unavoidable impurities, and
a steel structure containing martensite and bainite at more than or equal to 70% (including 100%), ferrite at less than 20% (including 0%), and retained austenite at less than 5% (including 0%) in terms of area ratio,
an amount of diffusible hydrogen in steel being less than or equal to 0.20 mass ppm of molecular hydrogen; and
a galvanizing layer provided on a surface of the steel sheet, having a content amount of Fe of 8 to 15% in mass %, and having an coating weight per one surface of 20 to 120 g/m²,
wherein an amount of Mn oxides contained in the galvanizing layer is less than or equal to 0.050 g/m², and
a tensile strength is more than or equal to 1100 MPa and a yield ratio is more than or equal to 0.85.

2. The high-strength galvanized steel sheet according to claim 1, wherein the component composition further contains at least one selected from the groups of A to C, in mass %,
group A:
at least one selected from, one or more of Ti, Nb, V, and Zr: 0.005 to 0.1% in total,
one or more of Mo, Cr, Cu, and Ni: 0.005 to 0.5% in total, and
B: 0.0003 to 0.005%;
group B:
any one or two selected from Sb: 0.001 to 0.1% and Sn: 0.001 to 0.1%; and
group C:
Ca: less than or equal to 0.0010%.

3. A method for manufacturing the high-strength galvanized steel sheet according to claim 1, comprising:
an annealing step of allowing a cold rolled material having the component composition according to claim 1 to stay in an atmosphere within an annealing furnace with a hydrogen concentration H of more than or equal to 1 vol % and less than or equal to 13 vol %, in a temperature region of temperature within the annealing furnace T of an $A_{c3}$ point−20° C. to 900° C. for more than or equal to 5 seconds, then performing cooling, and allowing the cold rolled material to stay in a temperature region of 400 to 550° C. for more than or equal to 10 seconds;

a coating step of subjecting a steel sheet after the annealing step to coating treatment and alloying treatment, and performing cooling down to less than or equal to 100° C. at an average cooling rate of more than or equal to 3° C./s; and a post heat treatment step of allowing a coated steel sheet after the coating step to stay in an atmosphere within a furnace with a hydrogen concentration H of less than or equal to 10 vol % and a dew point Dp of less than or equal to 50° C., at a temperature T (° C.) of more than or equal to 200° C. and less than or equal to 350° C. for more than or equal to a time t (hr) that is more than or equal to 0.005 (hr) and satisfies a formula (1)

$$130-18.3\times In(t) \leq T \quad (1).$$

4. The method for manufacturing a high-strength galvanized steel sheet according to claim 3, wherein, after the coating step, temper rolling is performed at an extension rate of more than or equal to 0.1%.

5. The method for manufacturing a high-strength galvanized steel sheet according to claim 4, wherein width trimming is performed after the post heat treatment step.

6. The method for manufacturing a high-strength galvanized steel sheet according to claim 4, wherein width trimming is performed before the post heat treatment step, and a staying time t (hr) for staying at a temperature T (° C.) of more than or equal to 200° C. and less than or equal to 350° C. in the post heat treatment step is more than or equal to 0.005 (hr) and satisfies a formula (2):

$$115-18.3\times In(t) \leq T \quad (2).$$

7. A method for manufacturing a high-strength galvanized steel sheet according to claim 1, comprising:

a pretreatment step of heating a cold rolled material, having the component composition according to claim 1, up to an $A_{c3}$ point to the $A_{c3}$ point+50° C. in a temperature region and performing pickling after said heating to form a pickled sheet;

an annealing step of allowing the pickled sheet to stay in an atmosphere within an annealing furnace with a hydrogen concentration H of more than or equal to 1 vol % and less than or equal to 13 vol %, in a temperature region of temperature within an annealing furnaces T of an $A_{c3}$ point−20° C. to 900° C. for more than or equal to 5 seconds, then performing cooling, and allowing the cold rolled material to stay in a temperature region of 400 to 550° C. for more than or equal to 10 seconds;

a coating step of subjecting a steel sheet after the annealing step to coating treatment and alloying treatment, and performing cooling down to less than or equal to 100° C. at an average cooling rate of more than or equal to 3° C./s; and a post heat treatment step of allowing a coated steel sheet after the coating step to stay in an atmosphere within a furnace with a hydrogen concentration H of less than or equal to 10 vol % and a dew point Dp of less than or equal to 50° C., at a temperature T (° C.) of more than or equal to 200° C. and less than or equal to 350° C. for more than or equal to a time t (hr) that is more than or equal to 0.005 (hr) and satisfies a formula (1):

$$130-18.3\times In(t) \leq T \quad (1).$$

8. The method for manufacturing a high-strength galvanized steel sheet according to claim 7, wherein, after the coating step, temper rolling is performed at an extension rate of more than or equal to 0.1%.

9. The method for manufacturing a high-strength galvanized steel sheet according to claim 8, wherein width trimming is performed after the post heat treatment step.

10. The method for manufacturing a high-strength galvanized steel sheet according to claim 8, wherein width trimming is performed before the post heat treatment step, and a staying time t (hr) for staying at a temperature T (° C.) of more than or equal to 200° C. and less than or equal to 350° C. in the post heat treatment step is more than or equal to 0.005 (hr) and satisfies a formula (2):

$$115-18.3\times In(t) \leq T \quad (2).$$

11. A method for manufacturing the high-strength galvanized steel sheet according to claim 2, comprising:

an annealing step of allowing a cold rolled material having the component composition according to claim 2 to stay in an atmosphere within an annealing furnace with a hydrogen concentration H of more than or equal to 1 vol % and less than or equal to 13 vol %, in a temperature region of temperature within the annealing furnace T of an $A_{c3}$ point−20° C. to 900° C. for more than or equal to 5 seconds, then performing cooling, and allowing the cold rolled material to stay in a temperature region of 400 to 550° C. for more than or equal to 10 seconds;

a coating step of subjecting a steel sheet after the annealing step to coating treatment and alloying treatment, and performing cooling down to less than or equal to 100° C. at an average cooling rate of more than or equal to 3° C./s; and a post heat treatment step of allowing a coated steel sheet after the coating step to stay in an atmosphere within a furnace with a hydrogen concentration H of less than or equal to 10 vol % and a dew point Dp of less than or equal to 50° C., at a temperature T (° C.) of more than or equal to 200° C. and less than or equal to 350° C. for more than or equal to a time t (hr) that is more than or equal to 0.005 (hr) and satisfies a formula (1)

$$130-18.3\times In(t) \leq T \quad (1).$$

12. The method for manufacturing a high-strength galvanized steel sheet according to claim 11, wherein, after the coating step, temper rolling is performed at an extension rate of more than or equal to 0.1%.

13. The method for manufacturing a high-strength galvanized steel sheet according to claim 12, wherein width trimming is performed after the post heat treatment step.

14. The method for manufacturing a high-strength galvanized steel sheet according to claim 12, wherein width trimming is performed before the post heat treatment step, and a staying time t (hr) for staying at a temperature T (° C.) of more than or equal to 200° C. and less than or equal to 350° C. in the post heat treatment step is more than or equal to 0.005 (hr) and satisfies a formula (2):

$$115-18.3\times In(t) \leq T \quad (2).$$

15. A method for manufacturing a high-strength galvanized steel sheet according to claim 2, comprising:
- a pretreatment step of heating a cold rolled material, having the component composition according to claim 2, up to an $A_{c3}$ point to the $A_{c3}$ point+50° C. in a temperature region and performing pickling after said heating to form a pickled sheet;
- an annealing step of allowing the pickled sheet to stay in an atmosphere within an annealing furnace with a hydrogen concentration H of more than or equal to 1 vol % and less than or equal to 13 vol %, in a temperature region of temperature within an annealing furnaces T of an $A_{c3}$ point−20° C. to 900° C. for more than or equal to 5 seconds, then performing cooling, and allowing the cold rolled material to stay in a temperature region of 400 to 550° C. for more than or equal to 10 seconds;
- a coating step of subjecting a steel sheet after the annealing step to coating treatment and alloying treatment, and performing cooling down to less than or equal to 100° C. at an average cooling rate of more than or equal to 3° C./s; and
- a post heat treatment step of allowing a coated steel sheet after the coating step to stay in an atmosphere within a furnace with a hydrogen concentration H of less than or equal to 10 vol % and a dew point Dp of less than or equal to 50° C., at a temperature T (° C.) of more than or equal to 200° C. and less than or equal to 350° C. for more than or equal to a time t (hr) that is more than or equal to 0.005 (hr) and satisfies a formula (1):

$$130-18.3\times ln(t) \leq T \quad (1).$$

16. The method for manufacturing a high-strength galvanized steel sheet according to claim 15, wherein, after the coating step, temper rolling is performed at an extension rate of more than or equal to 0.1%.

17. The method for manufacturing a high-strength galvanized steel sheet according to claim 16, wherein width trimming is performed after the post heat treatment step.

18. The method for manufacturing a high-strength galvanized steel sheet according to claim 16,
wherein width trimming is performed before the post heat treatment step, and
a staying time t (hr) for staying at a temperature T (° C.) of more than or equal to 200° C. and less than or equal to 350° C. in the post heat treatment step is more than or equal to 0.005 (hr) and satisfies a formula (2):

$$115-18.3\times ln(t) \leq T \quad (2).$$

* * * * *

UNITED STATES PATENT AND TRADEMARK OFFICE
CERTIFICATE OF CORRECTION

| | | |
|---|---|---|
| PATENT NO. | : 11,408,059 B2 | Page 1 of 1 |
| APPLICATION NO. | : 16/766398 | |
| DATED | : August 9, 2022 | |
| INVENTOR(S) | : Hiromi Yoshitomi et al. | |

It is certified that error appears in the above-identified patent and that said Letters Patent is hereby corrected as shown below:

On the Title Page

In abstract, page 2, Line 1, "and having an coating weight per one" should read -- and having a coating weight per one --

In the Specification

Column 3, Line 36, "and having an coating weight per one" should read -- and having a coating weight per one --

Column 4, Line 14, "up to an $A_{c3}$ point to the $A_{c3}$ point+50° C." should read -- up to an $A_{c1}$ point to the $A_{c3}$ point+50° C. --

In the Claims

In Claim 1, Column 26, Line 43, "and having an coating weight per one" should read -- and having a coating weight per one --

In Claim 7, Column 27, Line 46, "up to an $A_{c3}$ point to the $A_{c3}$ point+50° C." should read -- up to an $A_{c1}$ point to the $A_{c3}$ point+50° C. --

In Claim 15, Column 29, Line 5, "up to an $A_{c3}$ point to the $A_{c3}$ point+50° C." should read -- up to an $A_{c1}$ point to the $A_{c3}$ point+50° C. --

Signed and Sealed this
Thirty-first Day of January, 2023

*Katherine Kelly Vidal*

Katherine Kelly Vidal
*Director of the United States Patent and Trademark Office*